United States Patent [19]

Robinson, Jr.

[11] 3,740,837

[45] June 26, 1973

[54] PROCESS FOR MAKING A TOROIDAL INDUCTANCE COIL

[75] Inventor: Ralph O. Robinson, Jr., Silver Spring, Md.

[73] Assignee: The United States of America as represented by the Secretary of the Navy

[22] Filed: Apr. 2, 1954

[21] Appl. No.: 429,995

Related U.S. Application Data

[60] Division of Ser. No. 266,948, Jan. 17, 1952, abandoned, and a continuation-in-part of Ser. No. 543,285, Oct. 27, 1955.

[52] U.S. Cl. .......................... 29/602, 29/424, 29/558

[51] Int. Cl. .......................... H01f 7/06, B33p 17/00

[58] Field of Search .......................... 29/417, 424, 435, 29/557, 558, 602, 605, 606, 155.56, 155.57, 529, 533

[56] References Cited

UNITED STATES PATENTS

| | | | |
|---|---|---|---|
| 508,620 | 11/1893 | Johnson et al. | 29/155.56 |
| 1,801,214 | 4/1931 | Von Henke | 29/155.56 |
| 2,086,857 | 7/1937 | Derby | 29/533 |
| 2,401,472 | 6/1946 | Franklin | 29/155.56 |
| 2,435,242 | 2/1948 | Somes | 29/155.56 |
| 2,666,187 | 1/1954 | Ketcham | 29/155.56 |

*Primary Examiner*—Benjamin A. Borchelt
*Assistant Examiner*—James M. Hanley
*Attorney*—R. S. Sciascia and J. A. Cooke

EXEMPLARY CLAIM

1. The process of making a toroidal inductance coil, comprising producing a thin single layer conductive tube shaped as a toroid, converting said tube into a toroidally wound strip by severing it along a helical line, and severing said strip transversely to provide two electrical terminals for said inductance coil.

6 Claims, 3 Drawing Figures

PATENTED JUN 26 1973

3,740,837

INVENTOR.
RALPH O. ROBINSON, JR.
BY

PROCESS FOR MAKING A TOROIDAL INDUCTANCE COIL

This application is a division of abandoned U. S. patent application Ser. No. 266,948, filed Jan. 17, 1952, and refiled as a continuation-in-part patent application, Ser. No. 543,285 on Oct. 27, 1955, by the same inventor.

The present invention relates in general to an oscillator circuit that includes a toroidally wound inductance element, and more particularly to a radio frequency reaction oscillator that includes a toroidal inductance whereby such oscillator circuit may be made extremely small and compact.

In order to accommodate an oscillator in a proximity fuze, it is highly desirable that the oscillator be made as compact and tiny as possible because of the limited space available. However, the inductance that constitutes an essential part of such oscillator cannot be located too close to other circuit elements, because of inductive and capacitive disturbances that would result from such crowding and would reduce the "Q" of the coil and decrease the reaction sensitivity of the oscillator.

In accordance with the present invention these difficulties are eliminated by using a toroidally-wound coil as the inductance. As a toroid has practically no external magnetic field, it becomes possible to place certain other circuit components in close proximity to the coil. For example, the oscillator tube itself may be placed even within the central hole of the toroid, without adversely affecting the performance of the oscillator.

It is, therefore, an object of the invention to provide a reaction or influence oscillator circuit that includes a toroidal inductance.

Another object is to provide a very small and compact oscillator circuit.

A further object is to provide an efficient oscillator circuit suitable for use in proximity fuzes for projectiles and the like.

An additional object is to provide a small and very compact oscillator circuit that may be embedded in potting compound or molded into a suitable plastic material without detriment to the "Q" and efficiency of the oscillator.

Other objects and many of the attendant advantages of this invention will be appreciated readily as the same becomes understood by reference to the following detailed description, when considered in connection with the accompanying drawings, wherein.

Figures 1, 2:
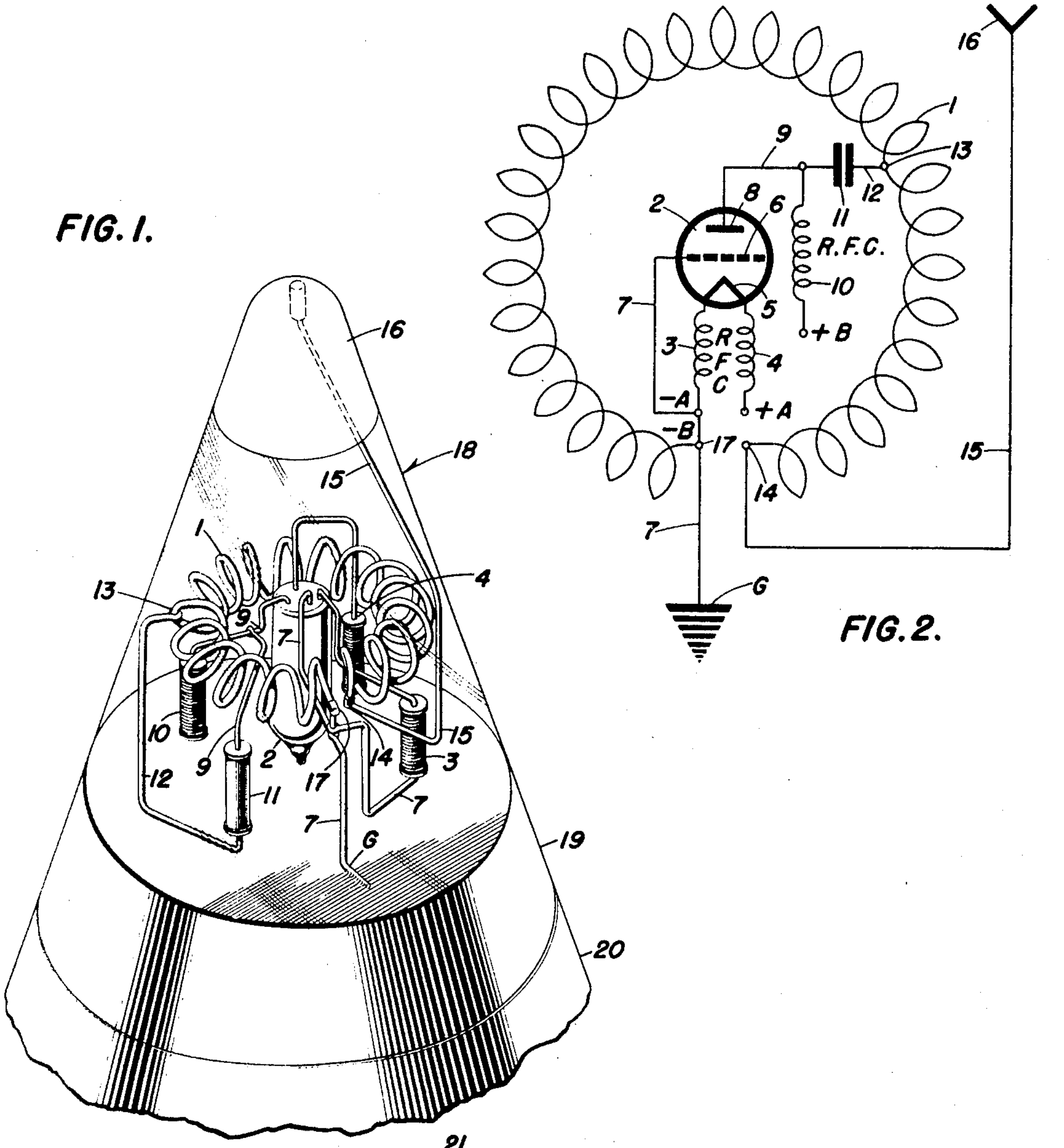
FIG. 1 is a perspective view, showing the invention mounted in the nose of a fuze.
FIG. 2 is a circuit diagram corresponding to FIG. 1.

Referring first to FIG. 2, there is shown an oscillator of the Colpitts type, employing a toroidally wound helix as the inductance or coil 1. A tube 2, here shown as a triode, is connected to the coil 1 as shown, namely, one end 17 of coil 1 is connected to conductor 7 which leads to the grid 6 of the triode tube 2. This conductor 7 also is connected to the common negative terminals of the "A" and "B" batteries (not shown) and to the ground G, in the conventional way.

The filament 5 of the triode tube 2 is connected to the −A terminal through a radio frequency choke coil 3 and to the +A terminal through a companion choke coil 4, to obtain its heating current. The anode 8 of the the triode tube 2 is connected through conductor 9, a capacitor 11 and a conductor 12 to a suitably located tap 13 of coil 1. Anode 8 is suitable energized through conductor 9 and a radio frequency choke coil 10 from the positive terminal +B of the B-battery or other source of electricity. The capacitor 11 serves as a stopping capacitor to prevent short-circuiting the B-battery while freely passing the high frequency oscillations generated by the triode tube 2. An antenna 16 is connected to the ungrounded end 14 of the helix coil 1 through the conductor 15. The triode tube 2, which is usually of sub-miniature type, may be located within the central opening of the helix coil 1 as shown best in FIG. 1, and such opening need only be large enough to admit the triode tube freely.

The toroidal coil 1 may be made by first winding a helix of wire on a straight form and then bringing the two ends of the helix near each other, upon bending the helix into toroidal shape. The form used in making the helix may be removed before curving the helix into toroidal shape, or if preferred it may be left in place permanently, in which event it should, of course, be made of a suitable low-loss dielectric material, such as polyethylene or polystyrene, for example.

Figure 3:
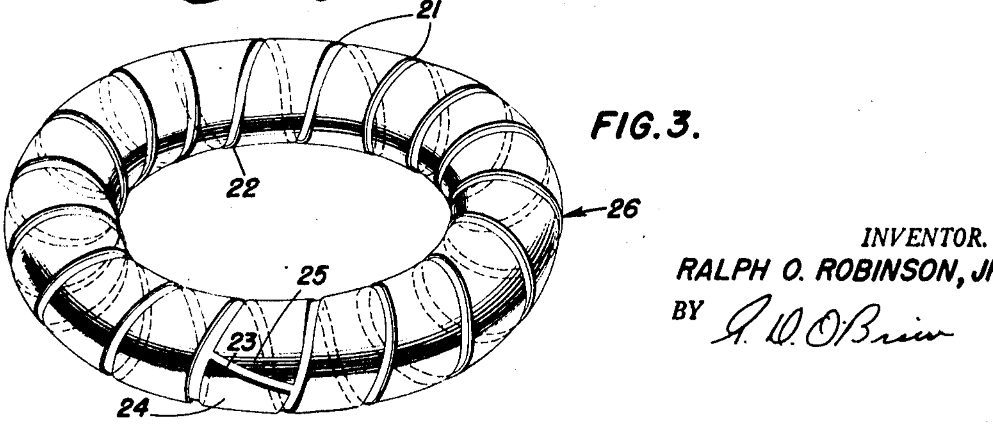
FIG. 3 is a perspective view showing an alternative form of toroidal winding that may be used as the inductance of the oscillator.

It is also possible to produce the toroidal winding in an entirely different way. This is illustrated in FIG. 3. Here a torus 26 made of a suitable dielectric material, for example polystyrene, is first provided. The entire surface of this torus is then coated with a conducting layer 21 of metal, which may be done in any preferred way, as by electroplating or by cathode deposition or evaporation in a vacuum, whereupon a helical line 22 may be etched or otherwise cut completely through the conducting layer as shown. A transverse cut is made as indicated at 23, thereby providing two terminals 24 and 25 for the helix now formed by the coating. These terminals correspond to the terminals 14 and 17 of the wire-wound toroidal coil 1 shown in FIG. 1. The intermediate tap (not shown) corresponding to 13 of FIG. 1 may be made at any suitable point along the coating 21. The dividing cut between the convolutions of the coating may be relatively narrow, but is shown exaggerated in width in the drawing. Narrowness of this cut is advantageous in decreasing magnetic leakage from the winding.

This form of toroidal winding has the advantage over wire-wound types that even the very small possibility of magnetic flux-leakage of the wire-wound toroid is still further reduced to practically zero. With either type of winding the entire circuit, including the electronic tube 2, choke coils 3, 4, and 10, capacitor 11 and toroidal coil 1 may be embedded completely in the usual potting compound without detriment to the efficiency and "Q" of the oscillator.

Reference to FIG. 1 demonstrates how the circuit components may be mounted compactly in a conical nose or tip 18 of the conventional fuze. The triode tube 2 is placed axially of the nose 18, preferably tip down, so that the lead-in wires are accessible above to simplify and shorten the connections between the wires and the other components of the circuit. The coil 1 surrounds the oscillator triode tube 2, and the choke coils 3, 4, and 10, and the capacitor 11 are optionally located in conventional suitably placed bores formed in the lower or base portion of the nose 18. The antenna 16 is shown as a metal cap at the tip of said nose 18. A metal fitting 19 provides a base for the fuze nose 18, and secures it to a projectile 20, which also constitutes the ground.

The structure may be manufactured either by previously molding the nose 18 of suitable plastic material, with all the necessary cavities ready-formed therein, or by molding the plastic in situ over the previously assembled and properly electrically connected circuit components whereby the entire structure becomes a rigid unit.

While the invention has been described with a triode tube 2 as the oscillator tube, it is obvious that this has been done purely by way of illustration, and no limitation to triode tubes is to be presumed therefrom.

Obviously many modifications and variations of the present invention are possible in the light of the above teachings. It is therefore to be understood that within the scope of the appended claims, the invention may be practiced otherwise than as specifically described.

What is claimed is:

1. The process of making a toroidal inductance coil, comprising, producing a thin single layer conductive tube shaped as a toroid, converting said tube into a toroidally wound strip by severing it along a helical line, and severing said strip transversely to provide two electrical terminals for said inductance coil.

2. The process of making a hollow ring shaped inductance coil, comprising, converting a thin single layer hollow conducting ring into a wound strip by dividing it along a helical line, and then dividing said strip transversely to provide two electrical terminals for said inductance coil.

3. The process of making an inductance coil, comprising, producing a single layer conductive tube shaped as a ring, converting said tube into a wound strip by dividing said tube along a helical line, and then dividing said strip transversely to provide two electrical terminals for said inductance coil.

4. The process of making a hollow ring shaped inductance coil, comprising, coating a torus with a conducting layer of material, converting said layer into a wound strip by dividing it along a helical line, and then dividing said strip transversely to provide two electrical terminals for said inductance coil.

5. The process as set forth in claim 4, wherein said conducting layer of material is formed on said torus by the step of electro-deposition of said material.

6. The process as set forth in claim 4 wherein said strip is divided along a helical line by the step of etching.

* * * * *